United States Patent
Pomirleanu et al.

(10) Patent No.: US 8,532,246 B2
(45) Date of Patent: Sep. 10, 2013

(54) NUCLEAR REACTOR ROBUST GRAY CONTROL ROD

(75) Inventors: Radu O. Pomirleanu, Columbia, SC (US); Michael J. Hone, New Alexandria, PA (US); C. Joseph Long, Columbia, SC (US); Michael C. Misvel, Irmo, SC (US); David L. Stucker, Irmo, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1622 days.

(21) Appl. No.: 11/840,424

(22) Filed: Aug. 17, 2007

(65) Prior Publication Data

US 2009/0046824 A1    Feb. 19, 2009

(51) Int. Cl.
 *G21C 7/00*    (2006.01)
(52) U.S. Cl.
 USPC .......................................................... 376/333
(58) Field of Classification Search
 USPC .......................................................... 376/333
 See application file for complete search history.

(56) References Cited

U.S. PATENT DOCUMENTS

| | | | | | |
|---|---|---|---|---|---|
| 3,733,251 | A | * | 5/1973 | Gilbertson et al. | 376/233 |
| 3,959,072 | A | * | 5/1976 | Dupen | 376/237 |
| 4,040,876 | A | * | 8/1977 | Bleiberg et al. | 148/327 |
| 4,062,725 | A | | 12/1977 | Bevilacqua et al. | |
| 4,169,759 | A | | 10/1979 | Bevilacqua et al. | |
| 4,169,760 | A | | 10/1979 | Bevilacqua | |
| 4,172,762 | A | | 10/1979 | Anthony et al. | |
| 4,326,919 | A | | 4/1982 | Hill | |
| 4,624,827 | A | | 11/1986 | Doshi et al. | |
| 4,678,628 | A | | 7/1987 | Freeman | |
| 4,707,329 | A | | 11/1987 | Freeman | |
| 4,820,478 | A | * | 4/1989 | Freeman | 376/333 |
| 5,064,607 | A | * | 11/1991 | Miller et al. | 376/333 |
| 6,614,869 | B1 | * | 9/2003 | Thibieroz et al. | 376/333 |

* cited by examiner

*Primary Examiner* — Jack W Keith
*Assistant Examiner* — Frank J McGue
(74) *Attorney, Agent, or Firm* — Joseph C. Spadacene; Westinghouse Electric Company LLC

(57) ABSTRACT

A control rod having a lower tip absorber material which exhibits substantially lower irradiation induced swelling than a second absorber material which extends above the lower tip absorber material. The lower tip absorber material having a substantially lower reactivity worth than the second absorber material, extends from a lower end plug of the control rod to an elevation just above a dashpot in a thimble guide tube in a nuclear fuel assembly when the control rod is fully inserted within the thimble guide tube.

12 Claims, 3 Drawing Sheets

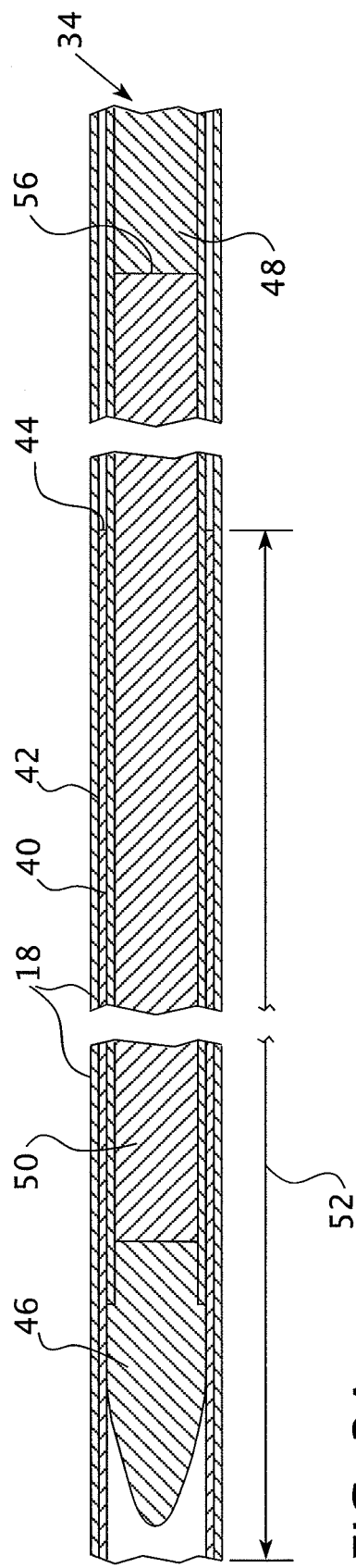
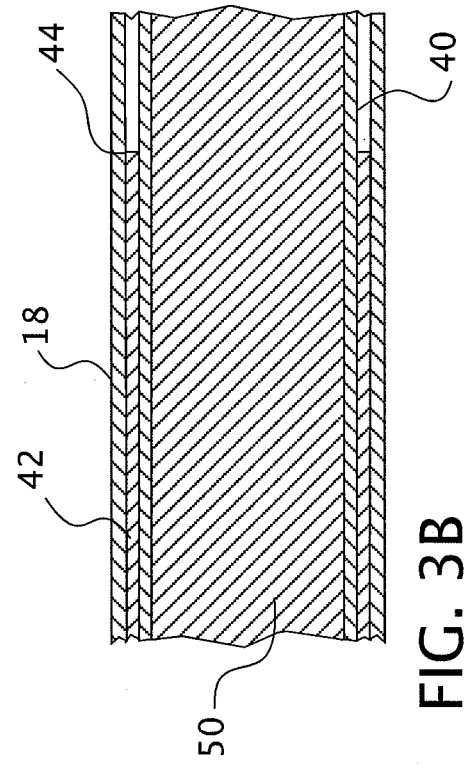
FIG. 3A
FIG. 3B

NUCLEAR REACTOR ROBUST GRAY CONTROL ROD

BACKGROUND OF THE INVENTION

1. Field of the Invention

The present invention relates generally to gray control rod assemblies for nuclear reactors and, more particularly, is concerned with an improvement to reduce swelling and heating in the neutron absorbing material in a dashpot region of a fuel assembly guide thimble when a gray control rod is fully inserted into the nuclear reactor core.

2. Description of the Related Art

In a typical nuclear reactor, the reactor core includes a large number of fuel assemblies, each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles, and supported by the transverse grids between the top and bottom nozzles. The fuel rods each contain fissile material and are grouped together in an array which is organized so as to provide a neutron flux in the core sufficient to support a high rate of nuclear fission, and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shut down, is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux, and thus, the heat output of the core, is normally regulated by the movement of the control rods into and from the guide thimbles.

One common arrangement utilizing control rods in association with the fuel assembly can be seen in U.S. Pat. No. 4,326,919 to Hill and assigned to the assignee of the present invention. This patent shows an array of control rods supported at their upper ends by a spider assembly, which in turn is connected to a control rod drive mechanism that vertically raises and lowers (referred to as a stepping action) the control rods into and out of the hollow guide thimbles of the fuel assembly. The typical construction of the control rod used in such an arrangement is in the form of an elongated metallic cladding tube having a neutron absorbing material disposed within the tube and with end plugs at opposite ends thereof for sealing the absorbent material within the tube. Generally, the neutron absorbing material is in the form of a stack of closely packed ceramic or metallic pellets which, in the case of a B4C absorber material, only partially fill the tube, leaving a void space or axial gap between the top of the pellets and the upper end plug which defines a plenum chamber for receiving gases generated during the control operation. A coil spring is disposed within this plenum chamber and held in a state of compression between the upper end plug and the top pellet so as to maintain the stack of pellets in their closely packed arrangement during stepping of the control rods.

Thus, control rods affect reactivity by changing direct neutron absorption. Control rods are used for fast reactivity control. A chemical shim, such as boric acid, is dissolved in the coolant to control long-term reactivity changes. More uniformly distributed throughout the core, the boron solution leads to a more uniform power distribution and fuel depletion than do control rods. The concentration of boron is normally decreased with core age to compensate for fuel depletion and fission product build up.

The build up of fission products, such as xenon-135, reduces reactivity by parasitically absorbing neutrons, thereby decreasing thermal utilization. The xenon-135 (hereinafter referred to as just "xenon") is removed by neutron absorption, or by decay. Upon a reduction in core power (such as during load follow, which is a reduction in reactor power in response to a reduction in power demand), fewer thermal neutrons are available to remove the xenon. Therefore, the concentration of xenon in the core increases.

This increase in xenon concentration which accompanies a reduction in core reactivity is usually compensated for by either decreasing the concentration of boron dissolved in the core coolant, or by withdrawing the control rods from the core. However, both of these methods have drawbacks. Changing the boron concentration requires the processing of coolant, i.e., water, which is difficult and not desired by the utility, especially towards the end of core life. Removal of control rods means that the core's return to power capability is reduced and peaking factors are increased.

The usual solution to this problem is to have several banks of reduced reactivity worth rods, known as gray rods, in the core at full power and which are available for removal at reduced power to compensate for xenon build up. In an advanced passive nuclear plant, known as the AP1000 reactor, designed by the assignee of this invention, gray rods with a relatively low reactivity worth will be used to compensate for gross changes in core reactivity during steady state and load follow operations. This operational strategy will result in gray control rods constantly being cycled in and out of the core, both at full power steady state and reduced power transient conditions. During this operation, one or more gray rod banks may become fully inserted for extended periods of time, with the control rod tips located in the dashpot region of the guide thimble tubes. The dashpot region is a reduced inside diameter section in the lower portion of the thimble guide tubes that slows the descent of the control rods when they are dropped into the core to lessen the impact of the spider on the top nozzle of the fuel assembly. The dashpot region at the bottom of each guide thimble tube is approximately two feet (0.61 meters) long. The coolant flow rate and coolant cross-sectional area in the dashpot region are slightly lower than in the remainder of the guide thimble tube when the control rod is inserted.

The anticipated technical challenges associated with this operating strategy may include:
  the potential for mechanical interference or binding between the gray control rod tip and the guide thimble tube in the dashpot region, due to radiation-induced swelling of the absorber material in some of the gray rods as a result of long-term rodded operation at power;
  boiling of the coolant in the dashpot region when the gray rods are fully inserted, leading to the potential for increased guide thimble corrosion rates and decreased heat transfer from the interior of the control rod; and
  fuel integrity challenges due to short-term local power changes when the gray control rods are ultimately withdrawn.

Accordingly, it is an object of this invention to overcome the enlargement of the control rod cladding diameter due to the radiation-induced swelling of the neutron absorbing material within the control rod in the region of the control rod cladding that encounters the dashpot when the control rod is fully inserted.

It is a further object of this invention to reduce the heating of the control rod tip in the region of the dashpot when the control rod is fully inserted.

It is an additional object of this invention to reduce the rapid change in reactivity that occurs in the core when the gray control rods are slowly removed.

SUMMARY OF THE INVENTION

These and other objectives are achieved by this invention which employs a lower worth absorber material with excellent radiation-induced swelling characteristics in the tips of the gray control rods. The preferred tip material is any of several commercial nickel structural alloys that are known to exhibit minimal swelling (substantially less than typical absorber materials, such as Ag—In—Cd) under extremely high neutron fluence conditions. This will significantly reduce the risk of the gray control rods mechanically interfering with the dashpot region, or failing to fully insert when called upon following a reactor trip. The reactivity worth of the nickel alloy lower section of the gray rod is approximately 50-60% of the main absorber material structure positioned above the lower section, which provides a transition region of low absorption between the absorber region and the lowermost tip of the gray control rod. In addition, the nickel alloy has approximately half the mean atomic weight of the main absorber material structure and has a significantly higher melting temperature. The internal heating rate will be significantly reduced in the nickel alloy tip zone, due to both lower neutron absorption and lower gamma heating. As a result, the risk of both boiling of the coolant in the dashpot region and centerline melting of the absorber material will be significantly lower if nickel alloy tips are used. Finally, the inclusion of a low worth absorber zone in the tip will result in more gradual increases in local power levels when the gray rods are withdrawn at slow rates (as would be typical for the majority of operation at full power steady state conditions). This more gradual increase in local power will significantly reduce the chance of fuel damage due to excessively large or rapid local power changes.

Preferably, the nickel alloy tips extend in height to slightly above the dashpot when the gray control rods are fully inserted, to an extent so that any likely bulging of the gray control rod cladding will not extend into the dashpot region.

BRIEF DESCRIPTION OF THE DRAWINGS

A further understanding of the invention can be gained from the following description of the preferred embodiments when read in conjunction with the accompanying drawings in which:

FIG. 3A is a sectional view of a rodlet of a gray rod control assembly, showing the lower portion of the rodlet inserted within the dashpot region of a thimble guide tube; and FIG. 3B is an enlarged sectional view of the upper dashpot region shown in FIG. 3A.

DESCRIPTION OF THE PREFERRED EMBODIMENTS

Figure 1:
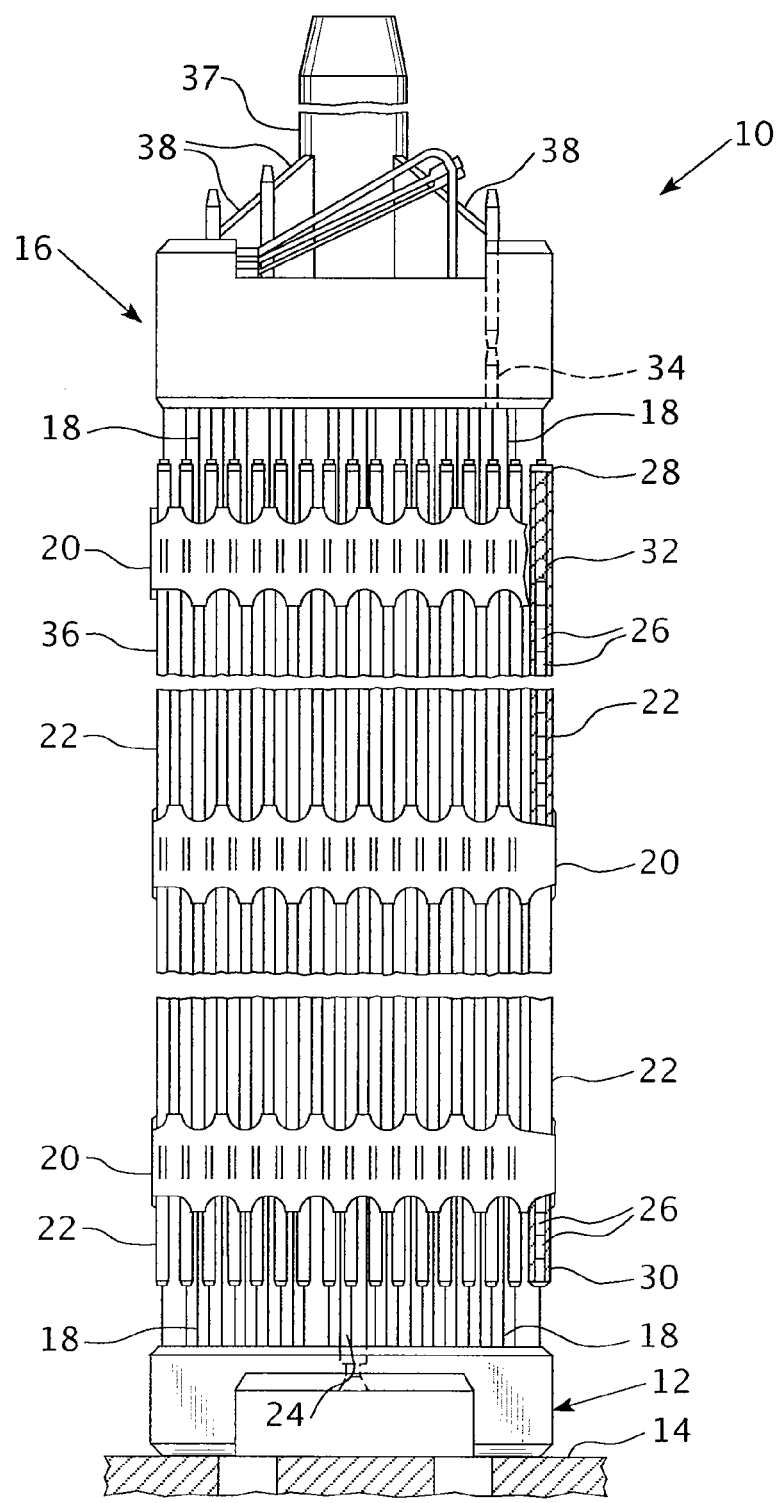
FIG. 1 is an elevational view of a fuel assembly, illustrated in vertically shortened form, and a control assembly therefor, partially shown in hidden line drawing.

For simplicity, this invention will be described with reference to a pressurized water reactor core design which is commercially known under the designation AP1000. The AP1000 reactor is a Westinghouse Electric Company LLC design. Westinghouse Electric Company LLC has its corporate offices in the greater Pittsburgh, Pa. area. Reference to the AP1000 reactor design is provided for illustrative example purposes only and is not meant to be limiting upon the scope of the invention. It should, therefore, be appreciated that the exemplary gray rod control assembly design of this preferred embodiment of the invention has application to a wide variety of other reactor designs.

Directional phrases used herein, such as, for example, upper, lower, top, bottom, left, right, and derivatives thereof for the most part relate to the orientation of the elements shown in the drawings and are not meant to be limiting upon the claims, unless expressly recited therein.

As employed herein, the statement that two or more parts are "coupled" together shall mean that the parts are joined together, either directly or joined through one or more intermediate parts.

As employed herein, the term "number" shall refer to one and more than one, i.e., a plurality.

Fuel Assembly

Referring now to the drawings, and particularly to FIG. 1, there is shown an elevational view of a nuclear reactor fuel assembly, represented in vertically shortened form and being generally designated by reference character 10. The fuel assembly 10 is the type used in a pressurized water reactor and has a structural skeleton which, at its lower end, includes a bottom nozzle 12 for supporting the fuel assembly 10 on a lower core support plate 14 in the core region of the nuclear reactor (not shown), a top nozzle 16 at its upper end, and a number of guide tubes or thimbles 18 which extend longitudinally between and are rigidly coupled at opposite ends to the bottom and top nozzles 12 and 16.

The fuel assembly 10 further includes a plurality of transverse grids 20 axially spaced along and mounted to the guide thimble tubes 18 and an organized array of elongated fuel rods 22 transversely spaced and supported by the grids 20. The assembly 10 also has an instrumentation tube 24 located in the center thereof and extending between and mounted to the bottom and top nozzles 12 and 16. In view of the foregoing arrangement of parts, it should be understood that the fuel assembly 10 forms an integral unit capable of being conveniently handled without damaging the assembly of parts.

As previously discussed, the array of fuel rods 22 in the fuel assembly 10 are held in spaced relationship with one another by the grids 20 which are spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water, or water containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly, in order to extract heat generated therein for the production of useful work. To control the fission process, a number of control rods 34 are reciprocally movable in the guide thimbles 18 located at pre-determined positions in the fuel assembly 10. A spider assembly 39 positioned above the top nozzle 16 supports the control rods 34.

Figure 2B:
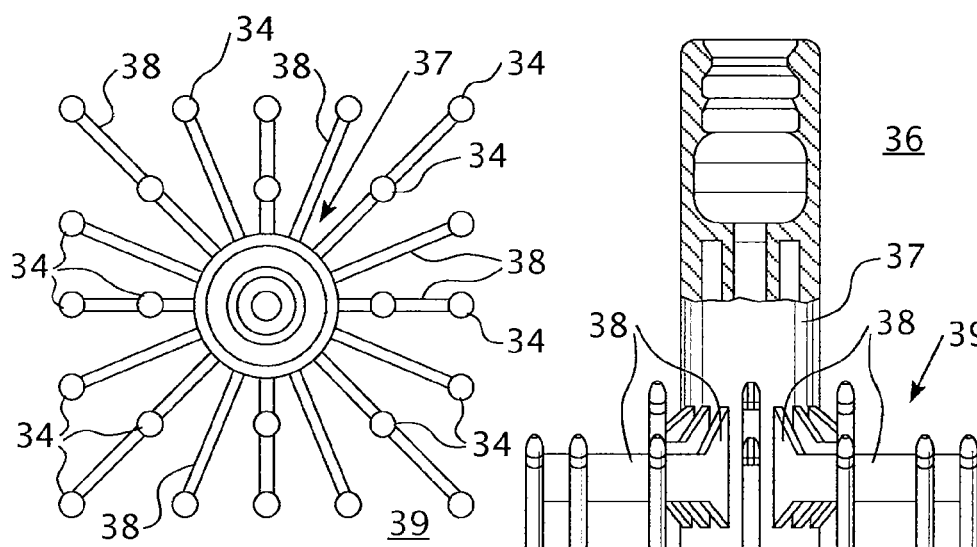
FIG. 2B is a top plan view of the control rod spider assembly for the control assembly of FIG. 2A.
Figure 2A:
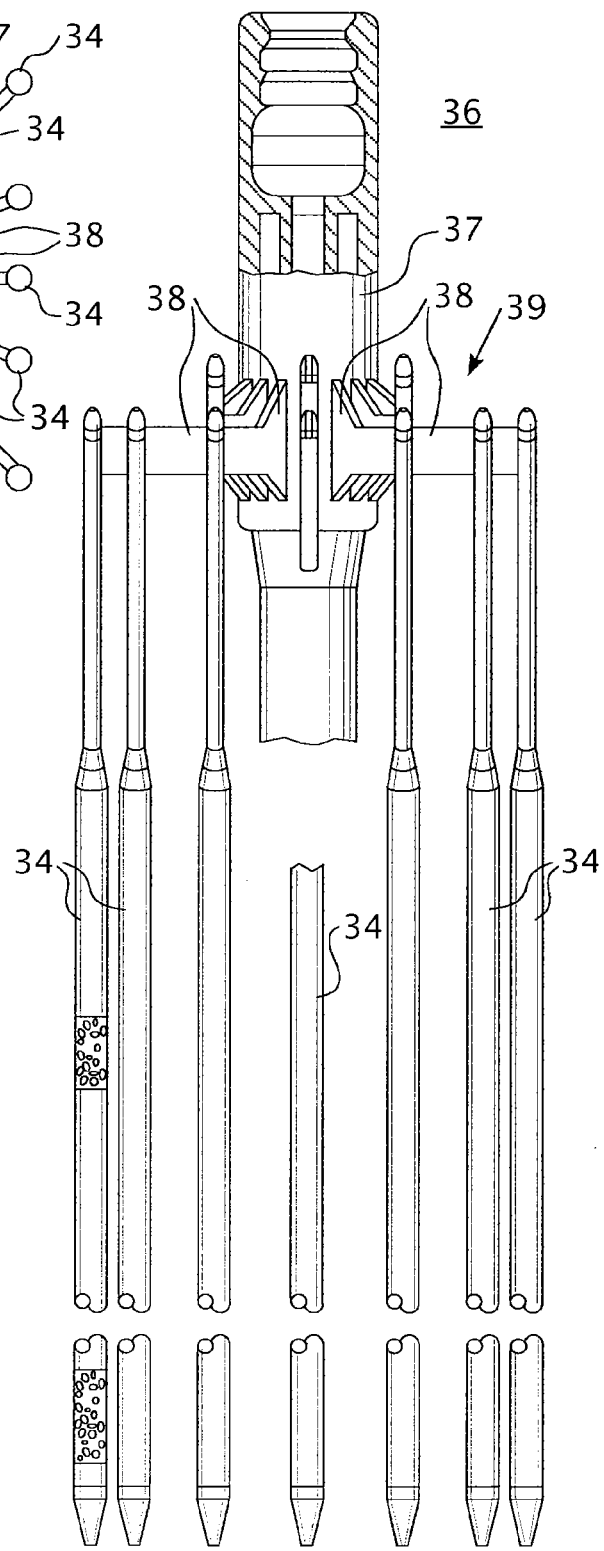
FIG. 2A is a partially sectioned elevational view of the control assembly of FIG. 1, which has been removed from the fuel assembly.

FIGS. 2A and 2B show the gray control rod assembly 36 after it has been removed from the fuel assembly 10 of FIG. 1. Generally, the gray control rod assembly 36 has a cylindrical member 37 with a plurality of radially extending flukes or arms 38 which comprise the spider assembly 39, best shown in FIG. 2B. Each arm 38 is interconnected to the gray control rods 34 such that the gray control rod assembly 36 is operable to move the gray control rods 34 vertically within the guide thimbles 18 (FIG. 1) to thereby control the fission process in the fuel assembly 10 (FIG. 1), all in a well-known manner. With the exception of the exemplary gray control rod assembly which comprises an advanced gray control rod design, which will be discussed below, all of the foregoing is old and generally well-known in the art. The following preferred embodiment of this invention will be shown as applied to a gray rod control assembly, which in substantially all respects is the same as a normal control rod assembly, except that the total reactivity worth of a gray control rod assembly is substantially less than a normal control rod assembly that is relied upon for shutdown.

Advanced Gray Rod Control Assembly

A nuclear control rod assembly is presented that is better capable of:
(a) reducing the potential for interference with the dashpot region of a nuclear fuel assembly due to absorber tip swelling;
(b) enhancing the thermal design margin with respect to dashpot boiling and absorber melting; and (c) reducing the thermal-mechanical duty in the fuel rod cladding upon control rod withdrawal. This concept provides all the benefits listed above if used in reactors where the fuel assemblies have a reduced inside diameter section of the thimble guide tubes, known as the dashpot region. When the control rods are dropped into the core, they displace water in the guide thimble tubes which slows their descent. The reduced diameter portion at the lower end of the guide thimble tubes further reduces the speed of the control rod's descent so it comes to a stop with a soft landing spaced axially from a bottom thimble tube end plug. This reduces the impact of the spider on the top nozzle 16. In the AP1000 reactor, gray control rods 34 with a relatively low reactivity worth will be used to compensate for gross changes in core reactivity during steady state and load follow operations. This operational strategy will result in gray control rods constantly being cycled in and out of the core, both at full power steady state and reduced power transient conditions. During this operation, one or more gray control rod banks may become fully inserted for extended periods of time with the control rod tips located in the dashpot region of the guide thimble tubes 18. The dashpot region at the bottom of each guide thimble tube is approximately two feet (0.61 meter), and has a reduced inner diameter. The coolant flow rate and coolant cross-sectional area in the dashpot region are significantly lower than in the remainder of the guide thimble tubes when the control rod is inserted. As noted previously, this is anticipated to create a number of technical challenges. The normal Ag—In—Cd absorber material is known to swell under extended irradiation and put pressure on the cladding of the control rods 34, expanding the cladding to some degree. The long-term rodded operation at power is anticipated to create some mechanical interference between the reduced diameter dashpot and the control rod cladding that could prevent the rods from being either fully inserted or withdrawn. Secondly, boiling of the coolant in the dashpot region when the gray rods are fully inserted is likely to occur due to the heating rates of Ag—In—Cd materials and the lower coolant flow rate. This could lead to the potential for increased guide thimble 18 corrosion rates and decreased heat transfer from the interior of the control rod 34. Lastly, there is concern over fuel rod integrity due to short-term local power changes when the gray rods are ultimately withdrawn.

The concept of this invention overcomes these concerns by replacing the lower section of a gray control rod 34 with a material with lower neutron absorption characteristics than the sections above, and that exhibits no significant swelling under irradiation. Examples of this type of material are Alloy 600 [UNS N06600], Alloy 625 [UNS N06625], Alloy 690 [UNS N06690] or Alloy 718 [UNS N07718]. The length of the lower section is desirably long enough such that the upper section material does not overlap with the reduced-inside-diameter region 52 of the fuel assembly guide thimble tubes (shown in FIG. 3A), known as the dashpot region. The lower section material could be in the shape of a rod, rods or pellets.

Referring to FIGS. 2A and 2B, the general control rod configuration is shown. In order to take advantage of the mechanical shim reactivity control capabilities afforded by low reactivity worth gray rods, as opposed to a chemical shim which requires changing the concentration of soluble boron in the reactor coolant, known control rod assemblies, such as the existing control rod assemblies 36 for the AP1000 reactor, employ gray rod control assemblies. However, while the gray rod control assembly design for the AP1000 reactor design has 24 rods which are generally configured as shown in FIG. 2B, some (if any) of the 24 rods may be stainless steel (e.g., without limitation SS-304) water displacing rods and the remainder of the rods are neutron absorber rods. Therefore, essentially all of the neutron absorbing material is localized and isolated in the gray rod assembly locations that do not have water displacer rods.

Additionally, in one embodiment of the AP1000 design, the absorber material comprises an Ag—In—Cd absorber consisting of about 80% silver, about 15% indium and about 5% cadmium. This absorbent material is consistent with known standard full-strength rod cluster control assemblies in which all 24 rods are Ag—In—Cd. However, it should be appreciated that the final design of the AP1000 may instead employ other traditional neutron absorbing material such as silver (Ag) as the main absorber, for example in the configuration described in U.S. patent application Ser. No. 11/189,472, filed Jul. 26, 2005 and assigned to the assignee of this invention.

In accordance with this invention, the use of a lower worth absorber material with excellent radiation-induced swelling characteristics in the tips of the gray control rods will reduce the likelihood of all of the noted risks identified for the control strategy to be employed with the AP1000 reactor. The preferred tip material is any of several commercial nickel structural alloys that are known to exhibit minimal swelling (substantially less than typical absorber material, such as Ag—In—Cd) under extremely high neutron fluence conditions, e.g., Alloy 600 [UNS 06600], Alloy 625 [UNS N06625], Alloy 690 [UNS N06690] and Alloy 718 [UNS N07718]. This will significantly reduce the risk of the gray control rods mechanically interfering with the dashpot region or failing to fully insert when called upon following a reactor trip. As previously mentioned, the reactivity worth of the nickel alloy lower section of the gray rod of this invention is approximately 50-60% of the absorber material planned to be used above this lower section of the gray control rod which provides the transition region of low absorption between the upper absorber region and the lower-most tip of the gray control rod. In addition, the nickel alloy has approximately half the mean atomic weight of the main absorber material, and has a significantly higher melting temperature. The internal heating rate will be significantly reduced in the nickel alloy tip zone, due to both lower neutron absorption and lower gamma heating. As a result, the risk of both boiling of the coolant in the dashpot region and centerline melting of the absorber material will be significantly lower if nickel alloy tips are used. Finally, the inclusion of a low worth absorber zone in the tip will result in more gradual increases in local power levels when the gray rods are withdrawn at slow rates (as would be typical for the majority of operation at full power steady state conditions). This more gradual increase in local power will significantly reduce the chance of fuel damage due to excessively large or rapid local power changes.

FIG. 3A shows the lower portion of a control rod 34 fully inserted within the dashpot 42. The control rod 34 comprises an elongated tubular cladding 40 having a lower end plug 46 and an upper end plug which is not shown. The nickel alloy material 50 extends from the lower end plug 46 to an elevation 56 along the control rod 34 that is just above the top of the dashpot 44. The gray rod upper absorber material 48 extends from the elevation 56 to a point below the upper control rod end cap. The combined length of the nickel alloy material 50 and the gray absorbent material 48 should be approximately equal to or greater than the length of the fuel pellet stack in the fuel assembly in which the control rod is to be inserted. When the control rod is fully inserted within the dashpot 42, it sits spaced above a lower end plug of the thimble guide tube 18. The total height of the dashpot is typically just under two feet (0.61 meters). The length of the nickel alloy material is gauged so that it extends just beyond the end of the dashpot upper end 44, a distance that will prevent any bulging of the control rod cladding 40 due to swelling of the absorber material 48 from reaching the top of the dashpot 44. FIG. 3B shows an enlarged section of an upper portion of FIG. 3A, which provides a better view of the interface between the walls of the thimble guide tube 18, the dashpot 42 and the gray control rod metal cladding 40 in the area of the nickel alloy tip 50. Preferably, the nickel alloy tip 50 does not extend more than 20% of the combined length of the nickel alloy tip 50 and the gray upper absorber material 48.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A control rod for a pressurized water nuclear reactor comprising:
    an elongated tubular cladding having an axial dimension with a first end at one extent of the axial dimension and a second end at another extent of the axial dimension, the tubular cladding having an outside diameter sized to fit within a narrowest dimension of a hollow interior of a control rod guide thimble within a nuclear fuel assembly, the control rod guide thimble hollow interior having an upper end that receives the control rod and a lower end that has a reduced internal diameter portion that functions as a dashpot when the control rod is dropped within the guide thimble, the reduced diameter portion extending from a lower portion of the control rod guide thimble upward for not more than twenty percent of a height of the hollow interior of the guide thimble;
    a first end plug closing off the first end of the elongated tubular cladding and designed to be slidably received within the dashpot;
    a first neutron absorbing material occupying a lower portion of the elongated tubular cladding in the vicinity of the lower end plug and extending a distance axially through the elongated tubular cladding substantially equal to or slightly greater than a length of the elongated tubular cladding that would be received within the dashpot when the control rod was fully inserted into the control rod guide thimble;
    a second neutron absorbing material occupying a portion of a remainder of the hollow interior of the elongated tubular member above the first neutron absorbing material, the second neutron absorbing material having a substantially higher reactivity worth than the first neutron absorbing material; and
    a second end plug for closing off the second end of the elongated tubular cladding.

2. The control rod of claim 1 wherein the first neutron absorbing material is a nickel alloy selected from the group of Alloy 600, Alloy 625, Alloy 690 and Alloy 718.

3. The control rod of claim 1 wherein the second neutron absorbing material swells under irradiation substantially more than the first neutron absorbing material.

4. The control rod of claim 1 wherein the control rod is a gray rod.

5. The control rod of claim 1 wherein the second neutron absorbing material is Ag—In—Cd or Ag.

6. The control rod of claim 1 wherein the first neutron absorbing material does not experience any significant swelling under irradiation.

7. The control rod of claim 1 wherein the first neutron absorbing material extends the distance axially through the elongated tubular cladding sufficiently above the length of the elongated tubular cladding that would be received within the dashpot when the control rod was fully inserted into the control rod guide thimble so that a likely enlargement of the cladding due to swelling of the second neutron absorbing material under irradiation does not extend into the area of the cladding received within the dashpot.

8. The control rod of claim 1 wherein the distance the first neutron absorbing material extends axially through the elongated tubular cladding is more than the distance that the dashpot extends from a lower control rod guide thimble end plug.

9. The control rod of claim 8 wherein the distance the first neutron absorbing material extends axially through the elongated tubular cladding is less than 2 ft (0.61 m).

10. The control rod of claim 9 wherein the first neutron absorbing material and the second neutron absorbing material extend collectively, axially through the elongated tubular cladding to a height equal to or above the height of a fuel pellet stack within a fuel assembly in which the control rod is to be inserted.

11. A control rod assembly for a pressurized water nuclear reactor having a plurality of control rods at least some of which comprise:

an elongated tubular cladding having an axial dimension with a first end at one extent of the axial dimension and a second end at another extent of the axial dimension, the tubular cladding having an outside diameter sized to fit within a narrowest dimension of a hollow interior of a control rod guide thimble within a nuclear fuel assembly, the control rod guide thimble hollow interior having an upper end that receives the control rod and a lower end that has a reduced internal diameter portion that functions as a dashpot when the control rod is dropped within the guide thimble, the reduced diameter portion extending from a lower portion of the control rod guide thimble upward for not more than twenty percent of a height of the hollow interior of the guide thimble;

a first end plug closing off the first end of the elongated tubular cladding and designed to be slidably received within the dashpot;

a first neutron absorbing material occupying a lower portion of the elongated tubular cladding in the vicinity of the lower end plug and extending a distance axially through the elongated tubular cladding substantially equal to or slightly greater than a length of the elongated tubular cladding that would be received within the dashpot when the control rod was fully inserted into the control rod guide thimble;

a second neutron absorbing material occupying a portion of a remainder of the hollow interior of the elongated tubular member above the first neutron absorbing member, the second neutron absorbing material having a substantially higher reactivity worth than the first neutron absorbing material; and a second end plug for closing off the second end of the elongated tubular cladding.

12. A pressurized water nuclear reactor comprising a core having a plurality of fuel assemblies at least some of which are aligned with a corresponding control assembly that raises and lowers a number of control rods each within a corresponding guide thimble within the fuel assemblies, at least some of the control rods comprising:

an elongated tubular cladding having an axial dimension with a first end at one extent of the axial dimension and a second end at another extent of the axial dimension, the tubular cladding having an outside diameter sized to fit within a narrowest dimension of a hollow interior of the control rod guide thimble of the corresponding nuclear fuel assembly, the control rod guide thimble hollow interior having an upper end that receives the control rod and a lower end that has a reduced internal diameter portion that functions as a dashpot when the control rod is dropped within the guide thimble, the reduced diameter portion extending from a lower portion of the control rod guide thimble upward for not more than twenty percent of a height of the hollow interior of the guide thimble;

a first end plug closing off the first end of the elongated tubular cladding and designed to be slidably received within the dashpot;

a first neutron absorbing material occupying a lower portion of the elongated tubular cladding in the vicinity of the lower end plug and extending a distance axially through the elongated tubular cladding substantially equal to or slightly greater than a length of the elongated tubular cladding that would be received within the dashpot when the control rod was fully inserted into the control rod guide thimble;

a second neutron absorbing material occupying a portion of a remainder of the hollow interior of the elongated tubular member above the first neutron absorbing material, the second neutron absorbing material having a substantially higher reactivity worth than the first neutron absorbing material; and a second end plug for closing off the second end of the elongated tubular cladding.

\* \* \* \* \*